(12) United States Patent
Rodwell et al.

(10) Patent No.: US 11,840,030 B2
(45) Date of Patent: Dec. 12, 2023

(54) METHOD FOR MANUFACTURING A STRUCTURAL COMPONENT OF A BLADE SEGMENT FOR A ROTOR BLADE OF A WIND TURBINE

(71) Applicant: General Electric Company, Schenectady, NY (US)

(72) Inventors: Andrew Mitchell Rodwell, Greenville, SC (US); Xu Chen, Simpsonville, SC (US); Julie Ann Shepherd, Liberty, SC (US); Scott Iverson Shillig, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/413,109

(22) PCT Filed: Dec. 11, 2018

(86) PCT No.: PCT/US2018/064847
§ 371 (c)(1),
(2) Date: Jun. 11, 2021

(87) PCT Pub. No.: WO2020/122867
PCT Pub. Date: Jun. 18, 2020

(65) Prior Publication Data
US 2022/0024162 A1    Jan. 27, 2022

(51) Int. Cl.
*F03D 1/06*     (2006.01)
*B29C 70/88*    (2006.01)
(Continued)

(52) U.S. Cl.
CPC .......... *B29C 70/885* (2013.01); *F03D 1/0675* (2013.01); *F03D 13/30* (2016.05);
(Continued)

(58) Field of Classification Search
CPC ..... F03D 1/0675; F03D 80/30; B29C 70/885; B29L 2031/085; F05B 2240/302; F05B 2280/6003
See application file for complete search history.

(56) References Cited

U.S. PATENT DOCUMENTS

| 851,196 A | 4/1907 | Bevans et al. |
| 4,474,536 A | 10/1984 | Gougeon et al. |

(Continued)

FOREIGN PATENT DOCUMENTS

| CN | 105690790 A | 6/2016 |
| EP | 2186622 A1 | 5/2010 |

(Continued)

OTHER PUBLICATIONS

International Search Report for PCT/US2018/064847, dated Sep. 19, 2019.
(Continued)

*Primary Examiner* — Courtney D Heinle
*Assistant Examiner* — Sang K Kim
(74) *Attorney, Agent, or Firm* — Dority & Manning, P.A.

(57) ABSTRACT

A method for manufacturing a structural component of a blade segment for a rotor blade includes providing a mold of the structural component having an outer wall that defines an outer surface of the structural component. The method also includes laying up one or more fiber layers in the mold so as to at least partially cover the outer wall. As such, the fiber layer(s) form the outer surface of the structural component. Further, the method includes providing one or more metal mesh layers having one or more ends. Moreover, the method includes providing a cover material to the end(s) of the metal mesh layer(s). In addition, the method includes placing the metal mesh layer(s) with the covered end(s) atop the fiber layer(s). Thus, the method includes infusing the fiber
(Continued)

layer(s) and the metal mesh layer(s) together via a resin material so as to form the structural component.

20 Claims, 10 Drawing Sheets

(51) Int. Cl.
  *F03D 13/30* (2016.01)
  *F03D 80/30* (2016.01)
  *B29L 31/08* (2006.01)

(52) U.S. Cl.
  CPC ........ *F03D 80/30* (2016.05); *B29L 2031/085* (2013.01); *F05B 2240/302* (2013.01); *F05B 2280/6003* (2013.01)

(56) References Cited

U.S. PATENT DOCUMENTS

| | | | |
|---|---|---|---|
| 4,643,646 A | 2/1987 | Hahn et al. | |
| 4,732,542 A | 3/1988 | Hahn et al. | |
| 4,737,618 A | 4/1988 | Barbier et al. | |
| 5,281,454 A | 1/1994 | Hanson | |
| 7,334,989 B2 | 2/2008 | Arelt | |
| 7,344,360 B2 | 3/2008 | Wetzel | |
| 7,901,188 B2 | 3/2011 | Llorente Gonzalez et al. | |
| 7,922,454 B1 | 4/2011 | Riddell | |
| 7,927,077 B2 | 4/2011 | Olson | |
| 7,997,874 B2 | 8/2011 | van der Bos | |
| 7,998,303 B2 | 8/2011 | Baehmann et al. | |
| 8,123,488 B2 | 2/2012 | Finnigan et al. | |
| 8,297,932 B2 | 10/2012 | Arocena De La Rua et al. | |
| 8,348,622 B2 | 1/2013 | Bech | |
| 8,356,982 B2 | 1/2013 | Petri Larrea et al. | |
| 8,376,713 B2 | 2/2013 | Kawasetsu et al. | |
| 8,388,316 B2 | 3/2013 | Arocena De La Rua et al. | |
| 8,517,689 B2 | 8/2013 | Kyriakides et al. | |
| 8,919,754 B2 | 12/2014 | Schibsbye | |
| 9,291,151 B2* | 3/2016 | Mironov ............ B29D 99/0028 | |
| 9,669,589 B2 | 6/2017 | Zamora Rodriguez et al. | |
| 2007/0018049 A1 | 1/2007 | Stuhr | |
| 2007/0074892 A1* | 4/2007 | Hibbard ................. H02G 13/40 | |
| | | | 174/117 FF |
| 2007/0194491 A1* | 8/2007 | Krogager ................ B29C 70/34 | |
| | | | 264/258 |
| 2007/0194991 A1 | 8/2007 | Mohamadi | |
| 2007/0253824 A1 | 11/2007 | Eyb | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2009/0257881 A1 | 10/2009 | Ostergaard Kristensen et al. | |
| 2010/0132884 A1 | 6/2010 | Baehmann et al. | |
| 2010/0215494 A1 | 8/2010 | Bech et al. | |
| 2010/0304170 A1 | 12/2010 | Frederiksen | |
| 2011/0052403 A1 | 3/2011 | Kawasetsu et al. | |
| 2011/0081247 A1 | 4/2011 | Hibbard | |
| 2011/0081248 A1 | 4/2011 | Hibbard | |
| 2011/0091326 A1 | 4/2011 | Hancock | |
| 2011/0158788 A1 | 6/2011 | Bech et al. | |
| 2011/0158806 A1 | 6/2011 | Arms et al. | |
| 2011/0159757 A1 | 6/2011 | Percival | |
| 2011/0229336 A1 | 9/2011 | Richter et al. | |
| 2012/0093627 A1 | 4/2012 | Christenson et al. | |
| 2012/0153539 A1 | 6/2012 | Henderson | |
| 2012/0163990 A1* | 6/2012 | Shimono ................. B32B 27/12 | |
| | | | 416/244 R |
| 2012/0196079 A1 | 8/2012 | Brauers et al. | |
| 2012/0213642 A1 | 8/2012 | Wang et al. | |
| 2012/0269643 A1 | 10/2012 | Hibbard et al. | |
| 2012/0308396 A1 | 12/2012 | Hibbard | |
| 2013/0040151 A1 | 2/2013 | Jeromerajan et al. | |
| 2013/0049249 A1 | 2/2013 | Frankowski et al. | |
| 2013/0064663 A1 | 3/2013 | Loth et al. | |
| 2013/0129518 A1 | 5/2013 | Hayden et al. | |
| 2013/0149154 A1 | 6/2013 | Kuroiwa et al. | |
| 2013/0164133 A1 | 7/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0219718 A1 | 8/2013 | Busbey et al. | |
| 2013/0224032 A1 | 8/2013 | Busbey et al. | |
| 2013/0236307 A1 | 9/2013 | Stege | |
| 2013/0236321 A1 | 9/2013 | Olthoff | |
| 2014/0286780 A1 | 9/2014 | Lemos et al. | |
| 2015/0183171 A1 | 7/2015 | Kline et al. | |
| 2015/0204200 A1 | 7/2015 | Eyb et al. | |
| 2015/0369211 A1 | 12/2015 | Merzhaeuser | |
| 2015/0377217 A1 | 12/2015 | Sandercock et al. | |
| 2017/0082087 A1 | 3/2017 | Yarbrough et al. | |
| 2017/0268479 A1 | 9/2017 | Caruso et al. | |

FOREIGN PATENT DOCUMENTS

| | | |
|---|---|---|
| EP | 3144526 A1 | 3/2017 |
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

OTHER PUBLICATIONS

Foreign Office Action for CN application No. 201880100201.5, dated Jul. 6, 2022.
The machine translation of the JP foreign office action for JP application No. 2021-532197, dated Sep. 20, 2022, 7 pages.

* cited by examiner

METHOD FOR MANUFACTURING A STRUCTURAL COMPONENT OF A BLADE SEGMENT FOR A ROTOR BLADE OF A WIND TURBINE

FIELD

The present disclosure relates generally to wind turbines, and more particularly to a method for manufacturing a structural component of a blade segment for a rotor blade of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

In addition, as wind turbines continue to increase in size, the rotor blades also continue to increase in size. As such, modern rotor blades may be constructed in segments that are joined together at one or more joints. Accordingly, certain jointed rotor blades include a first blade segment having a beam structure that is received within a receiving section of a second blade segment that is further secured together via one or more span-wise and chord-wise extending pins that transfer the blade bending moment from one segment to the other. Moreover, the reactions from the pins are transferred to various bearing blocks at the joint locations via one or more bushings.

Manufacturing the large structural components of the blade segments can be complex. For example, in certain instances, the beam structure and/or the receiving section may include a metal mesh embedded therein for lightning protection. As such, for current manufacturing processes, the metal mesh must be laid into the mold of the structural component adjacent to one or more fabric layers thereof. In addition, the fabric layers need to be tensioned in ordered to ensure a consolidated layup. As the metal mesh is less pliable and stiffer than the fabric layers, the edges of the metal mesh tend to catch and snag on the fabric layers during tensioning. Therefore, certain quality issues (such as wrinkles) can occur in the structural component during layup and tensioning the fabric.

Accordingly, the present disclosure is directed to methods for manufacturing a structural component of a blade segment for a rotor blade of a wind turbine that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for preventing manufacturing defects in a manufacturing process of a structural component of a blade segment of a rotor blade of a wind turbine. The method includes providing one or more metal mesh layers having one or more ends. The method also includes covering the end(s) of the metal mesh layer(s) with a cover material. Further, the method includes placing the metal mesh layer(s) with the covered end(s) adjacent to one or more fiber layers. Moreover, the method includes forming the structural component with the metal mesh layer(s) having the covered end(s) and the fiber layer(s).

In one embodiment, the method may include tensioning, e.g. by means of expansion within a mold or otherwise, the fiber layer(s) after placing the metal mesh layer(s) with the covered end(s) adjacent to the fiber layer(s). In another embodiment, the cover material may include, for example, a composite fabric material (such as a chopped strand mat (CSM), a biax fabric, or a prepreg material), a prefabricated composite part, an adhesive, a resin, and/or any other suitable liquid material that hardens after application so as to provide a suitable cover to the edge(s) of the metal mesh layer(s). In further embodiments, the metal mesh layer(s) may be constructed, at least in part, of copper or any other suitable metal material.

In additional embodiments, forming the structural component with the metal mesh layer(s) having the covered end(s) and the fiber layer(s) may include placing the metal mesh layer(s) having the covered end(s) and the fiber layer(s) into a mold of the structural component and infusing the metal mesh layer(s) having the covered end(s) and the fiber layer(s) together via a resin material. In another embodiment, forming the structural component with the metal mesh layer(s) having the covered end(s) and the fiber layer(s) may include placing one or more structural features into the mold and infusing the structural feature(s) with the metal mesh layer(s) having the covered end(s) and the fiber layer(s) together via the resin material.

In further embodiments, the structural component may include a beam structure of a blade segment, a receiving section of the blade segment, or similar. In certain embodiments, the resin material may include a thermoset resin or a thermoplastic resin.

In several embodiments, the metal mesh layer(s) are configured to provide lightning protection to the structural component during operation of the wind turbine and/or structural support to the structural component.

In another aspect, the present disclosure is directed to a method for manufacturing a structural component of a blade segment for a rotor blade of a wind turbine. The method includes providing a mold of the structural component. The method also includes laying up one or more fiber layers in or on the mold. As such, the fiber layer(s) form a surface of the structural component. Further, the method includes providing one or more metal mesh layers having one or more ends. Moreover, the method includes providing a cover material to the end(s) of the metal mesh layer(s). In addition, the method includes placing the metal mesh layer(s) with the covered end(s) atop the fiber layer(s). Thus, the method includes infusing the fiber layer(s) and the metal mesh layer(s) together via a resin material so as to form the structural component. It should be understood that the method may further include any of the additional steps and/or features as described herein.

In yet another aspect, the present disclosure is directed to a structural component for a blade segment of a rotor blade of a wind turbine. The structural component includes one or more metal mesh layers having one or more ends, a cover material covering the end(s) of the metal mesh layer(s), one or more fiber layers adjacent to the metal mesh layer(s), and a resin material that secures the metal mesh layer(s), the cover material, and the fiber layer(s) together. It should be understood that the structural component may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
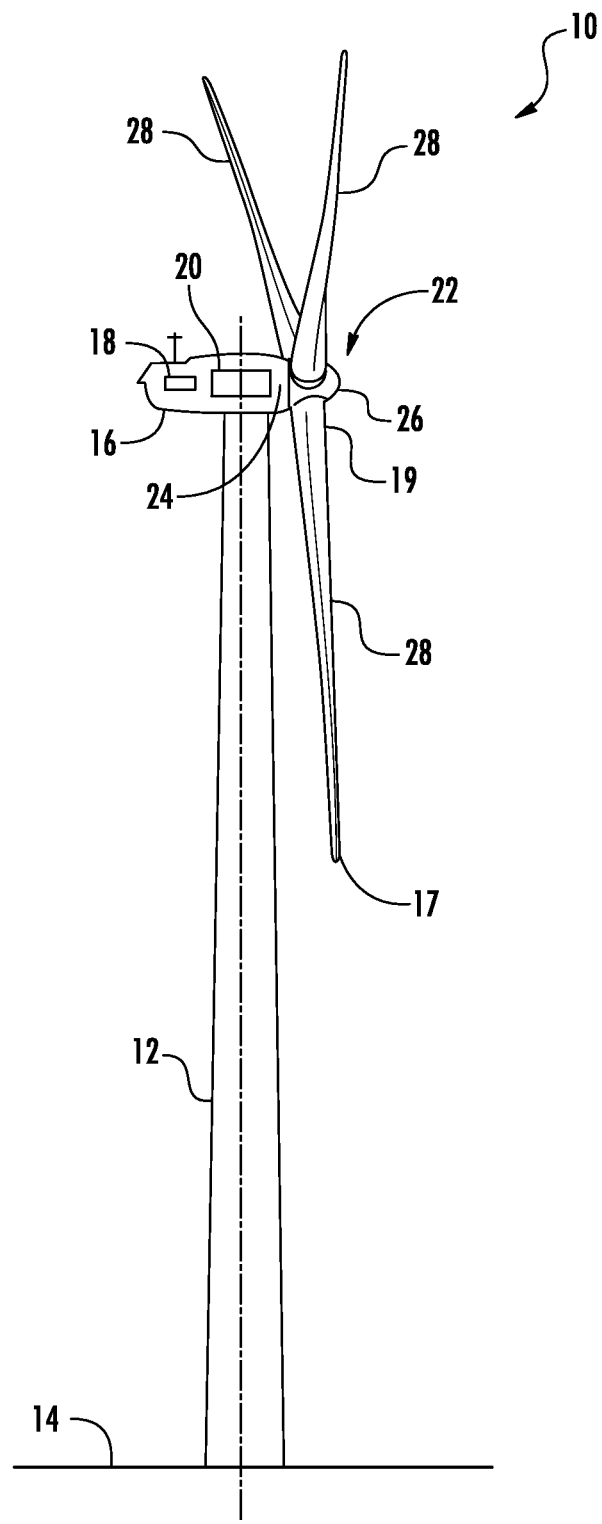
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
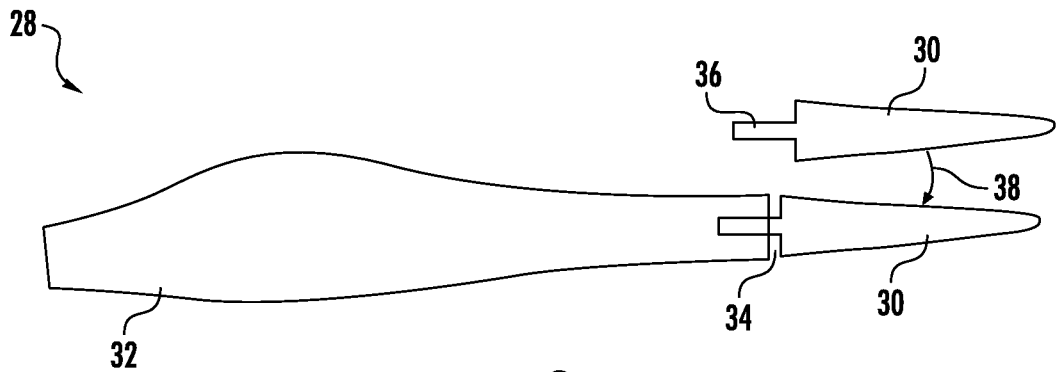
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member, such as pressure side shell member and/or a suction side shell member. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32. In addition, as shown, the second blade segment includes multiple spar structures 66 (also referred to herein as spar caps) that extend lengthwise for connecting with a blade root section 35 of the rotor blade 28 (which is shown in more detail in FIG. 7) and with the beam structure 40 of the first blade segment 30 (which is shown in more detail in FIG. 5).

Figure 3:
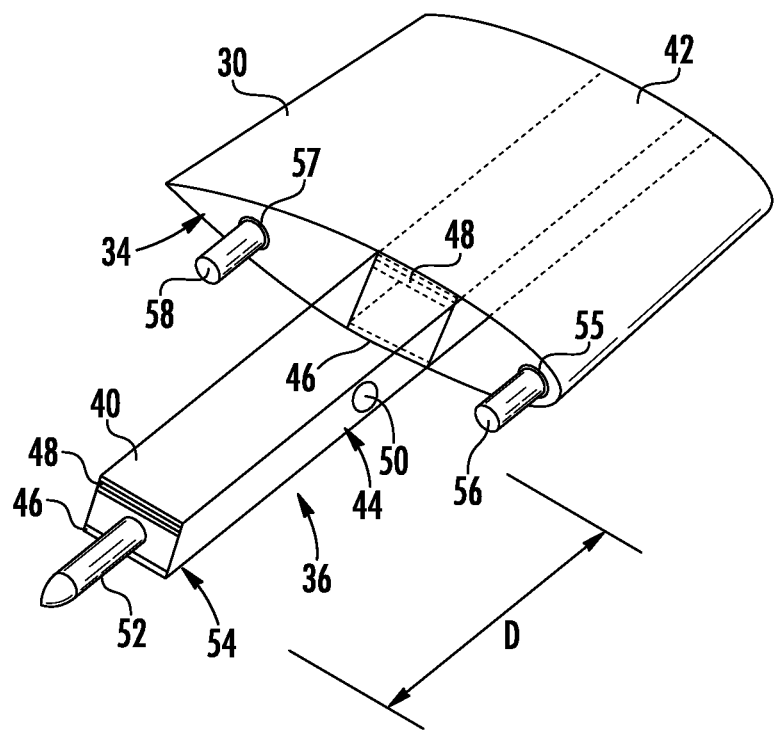
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms a part of the first blade segment 30 having an extension protruding from a spar section 42, thereby forming an extending spar section. The beam structure 40 includes a shear web 44 connected with a suction side spar cap 46 and a pressure side spar cap 48.

Moreover, as shown, the first blade segment 30 may include one or more first pin joints towards a first end 54 of the beam structure 40. In one embodiment, the pin joint may include a pin that is in a tight interference fit with a bushing. More specifically, as shown, the pin joint(s) may include one pin tube 52 located on the beam structure 40. Thus, as shown, the pin tube 52 may be oriented in a span-wise direction. Further, the first blade segment 30 may also include a pin joint slot 50 located on the beam structure 40 proximate to the chord-wise joint 34. Moreover, as shown, the pin joint slot 50 may be oriented in a chord-wise direction. In one example, there may be a bushing within the pin joint slot 50 arranged in a tight interference fit with a pin tube or pin (shown as pin 53 in FIG. 6). Further, the first blade segment 30 may include multiple second pin joint tubes 56, 58 located at the chord-wise joint 34. Thus, as shown, the second pin joint tubes 56, 58 may include a leading edge pin joint tube 56 and a trailing edge pin joint tube 58. Further, each of the second pin joint tubes 56, 58 may be oriented in a span-wise direction. In addition, as shown, each of the second pin joint tubes 56, 58 may include multiple flanges 55, 57, respectively, that are configured to distribute compression loads at the chord-wise joint 34.

It is to be noted that the pin tube 52 located at the first end of the beam structure 40 may be separated span-wise with the multiple second pin joint tubes 56, 58 located at the chord-wise joint 34 by an optimal distance D. This optimal distance D may be such that the chord-wise joint 34 is able to withstand substantial bending moments caused due to shear loads acting on the chord-wise joint 34. In another embodiment, each of the pin joints connecting the first and second blade segments 30, 32 may include an interference-fit steel bushed joint.

Figure 4:
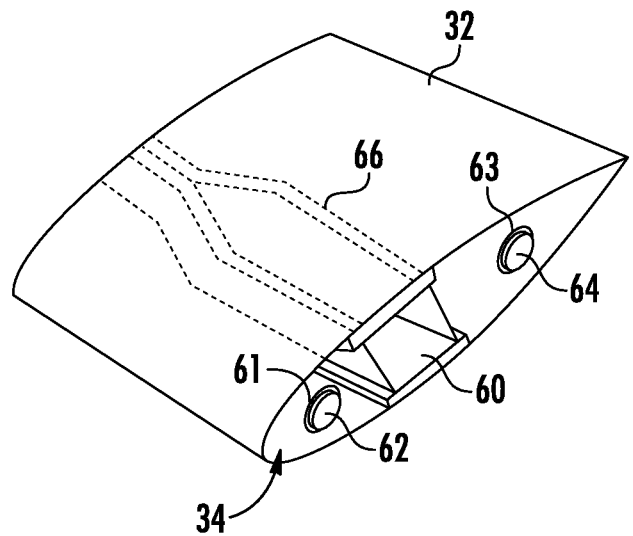
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthwise within the second blade segment 32 for receiving the beam structure 40 of the first blade segment 30. The receiving section 60 includes the spar structures 66 that extend lengthwise for connecting with the beam structure 40 of the first blade segment 30. As shown, the second blade segment 32 may further include pin joint slots 62, 64 for receiving pin tubes 56, 58 (shown in FIG. 3) of the first blade segment 30 and forming tight interference fittings. In one example, each of the multiple pin joint slots 62, 64 may include multiple flanges 61, 63, respectively, that are configured to distribute compression loads at the chord-wise joint 34.

Figure 5:
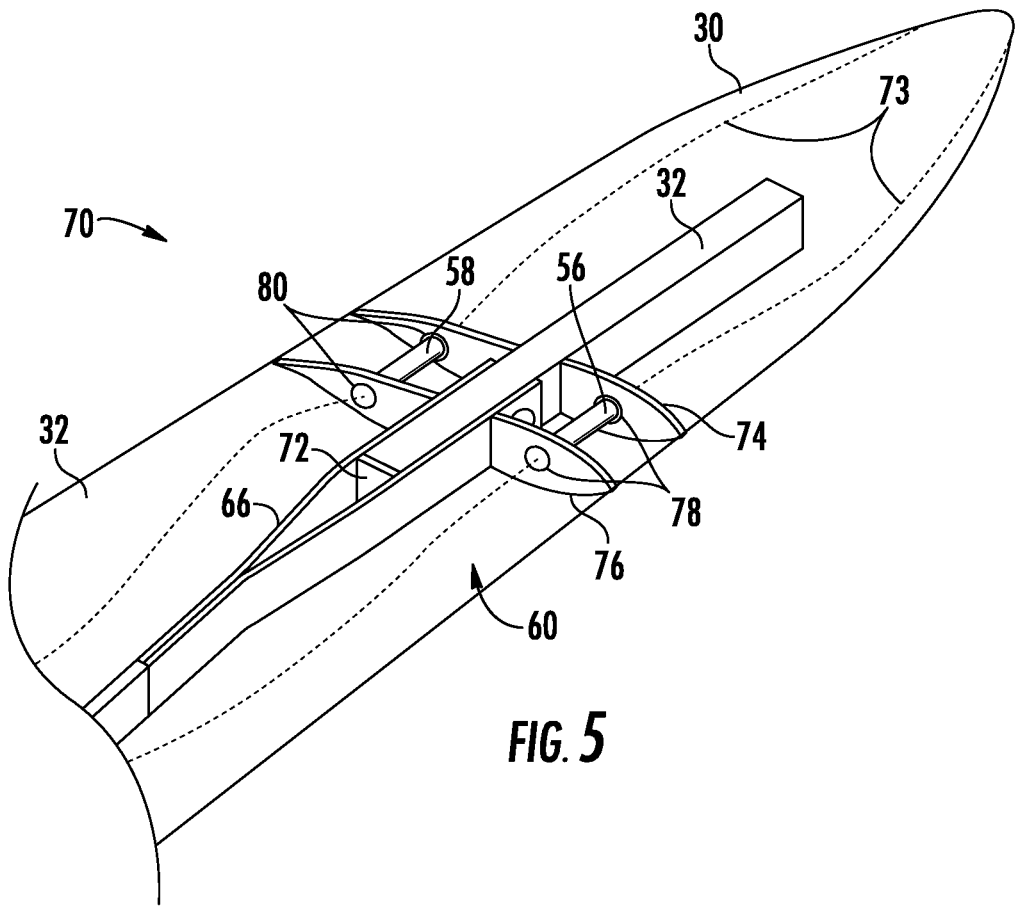
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. Further, as shown, the receiving section 60 includes the multiple spar structures 66 extending lengthwise and supports the beam structure 40. The receiving section 60 also includes a rectangular fastening element 72 that connects with the pin tube 52 of the beam structure 40 in the span-wise direction. Further, the first and the second blade segments 30, 32 may also include chord-wise members 74, 76 respectively at the chord-wise joint 34. Further, as shown, the chord-wise members 74, 76 may include leading edge pin openings 78 and trailing edge pin openings 80 that allows pin joint connections between the first and second blade segments 30, 32. For example, as shown, the chord-wise members 74, 76 are connected by pin tubes 56 and 58 that are in tight interference fit with bushings located in the leading edge pin openings 78 and the trailing edge pin openings 80. In another embodiment, each of the spar structures 66, the rectangular fastening element 72, and the chord-wise members 74, 76 may be constructed of glass reinforced fibers. In this example, the assembly 70 may also include multiple lightening receptor cables 73 that are embedded between the multiple pin tubes or pins 56, 58 and the bushing connections attached to the chord-wise members 74, 76.

Figure 6:
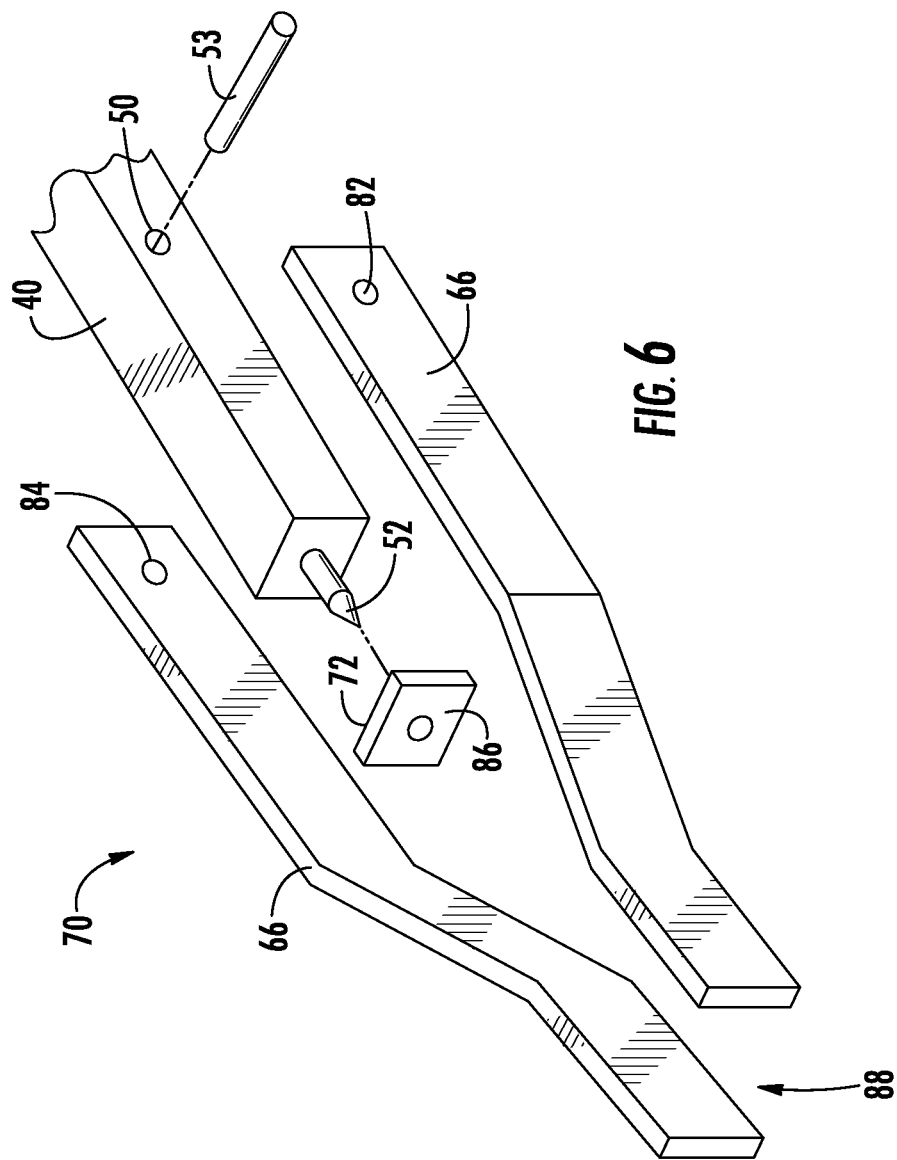
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, a pair of spar structures 66 is configured to receive the beam structure 40 and includes pin joint slots 82, 84 that are aligned with the pin joint slot 50 of the beam structure 40 through which a pin tube or pin 53 may be inserted. Further, the pin 53 is configured to remain in a tight interference fit within the aligning pin joint slots 82, 50, 84 such that spar structures 66 and the beam structure 40 are joined together during assembling. Further, FIG. 6 also illustrates a fastening element 72 that includes a pin joint slot 86 configured for receiving the pin tube 52 of the beam structure 40. As such, the pin tube 52 is configured to form a tight interference fit pined joint. Further, the pair of spar structures 66 may be joined together at one end 88 using any suitable adhesive material or an elastomeric seal.

Figure 7:
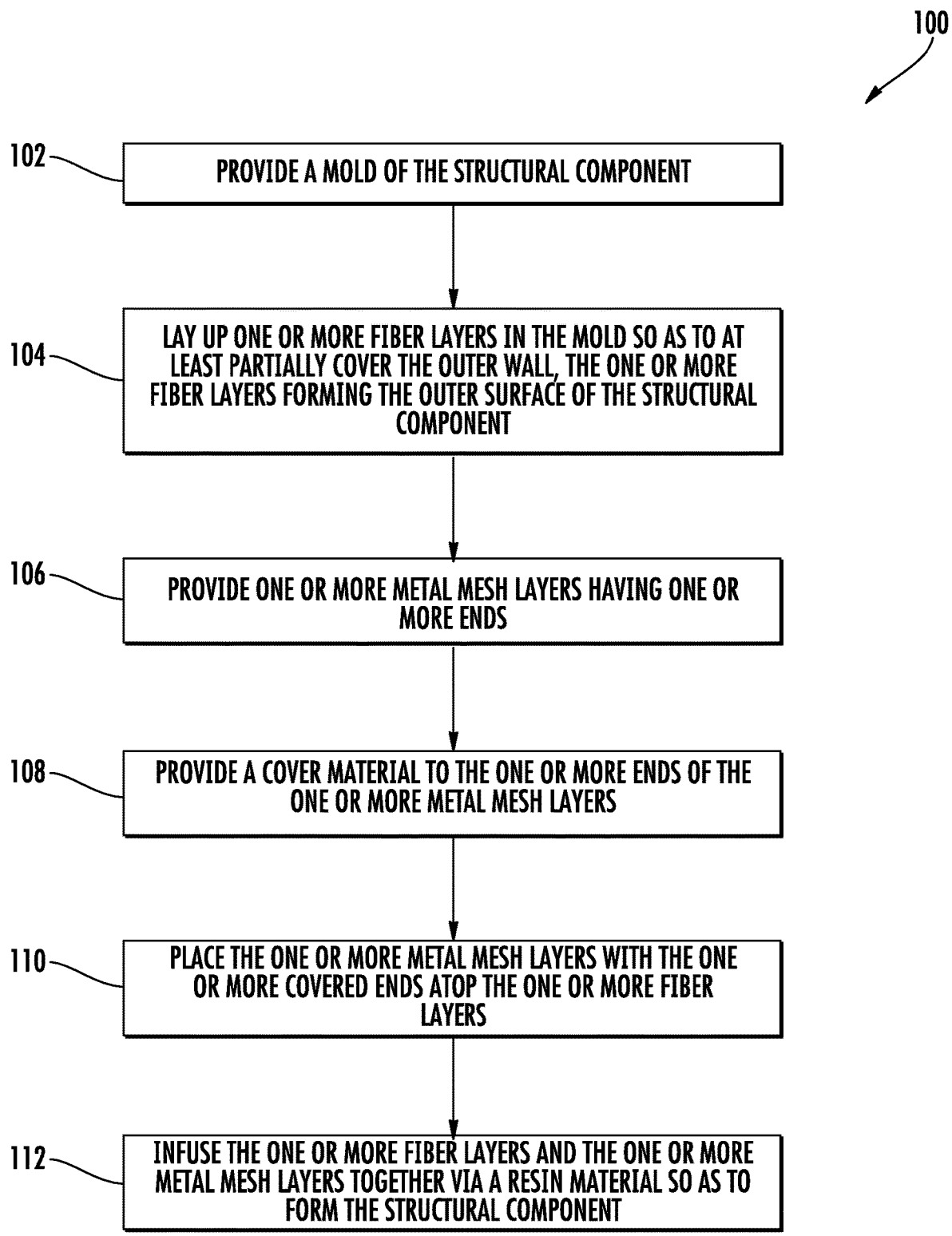
FIG. 7 illustrates a flow chart of one embodiment of a method for manufacturing a structural component of a blade segment for a rotor blade of a wind turbine according to the present disclosure.

Referring now to FIG. 7, a flow chart 100 of a method for manufacturing a structural component of a blade segment for a rotor blade of a wind turbine according to the present disclosure is illustrated. In general, the method 100 will be described herein with reference to the beam structure 40 of the rotor blade 28 shown in FIGS. 1-6 and 8-12. However, it should be appreciated that the disclosed method 100 may be implemented with any other suitable structural component of the rotor blade 28 (such as the receiving section 60) having any other suitable configurations. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 8:
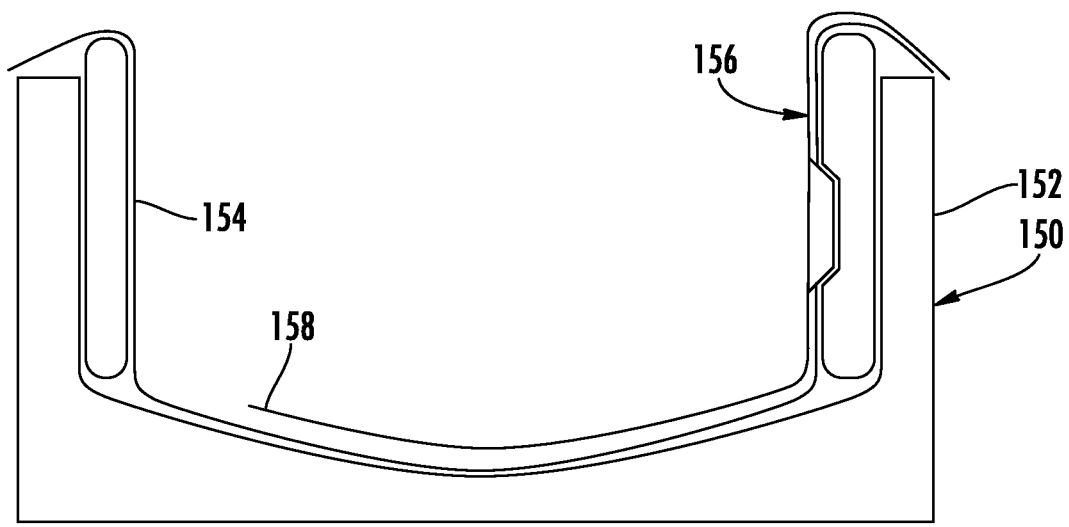
FIG. 8 illustrates a front view of one embodiment of a mold of a beam structure of a blade segment of a rotor blade according to the present disclosure, particularly illustrating a metal mesh layer laid up in the mold adjacent to a fiber layer, the metal mesh layer having its ends covered with a cover material.

As shown at (102), the method 100 includes providing a mold 150 of the beam structure 40. For example, as shown in FIG. 8, the mold 150 may have an outer wall 152 that defines an outer surface of the beam structure 40. Alternatively, the mold 150 may have a wall that defines an inner surface of the rotor blade component. As shown at (104), the method 100 includes laying up one or more fiber layers 154 in or on the mold 150. For example, as shown in FIG. 8, an outer fiber layer 154 is illustrated within the mold 150. As such, in the illustrated embodiment, the fiber layer(s) 154 forms the outer surface of the finished beam structure 40.

Figure 11:
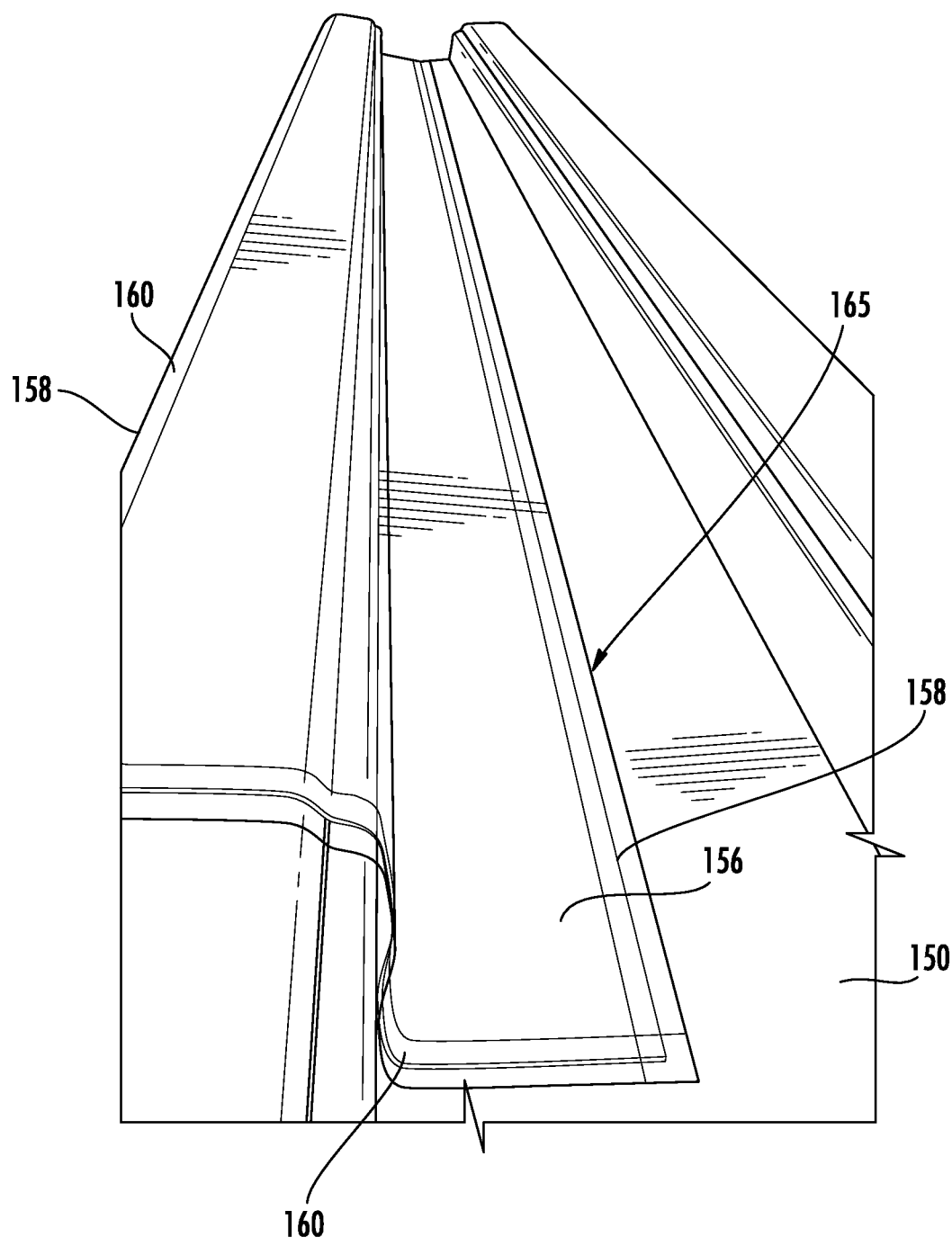
FIG. 11 illustrates a perspective view one of embodiment of the metal mesh layer laid up in a mold of a beam structure of a blade segment of a rotor blade according to the present disclosure.
Figure 12:
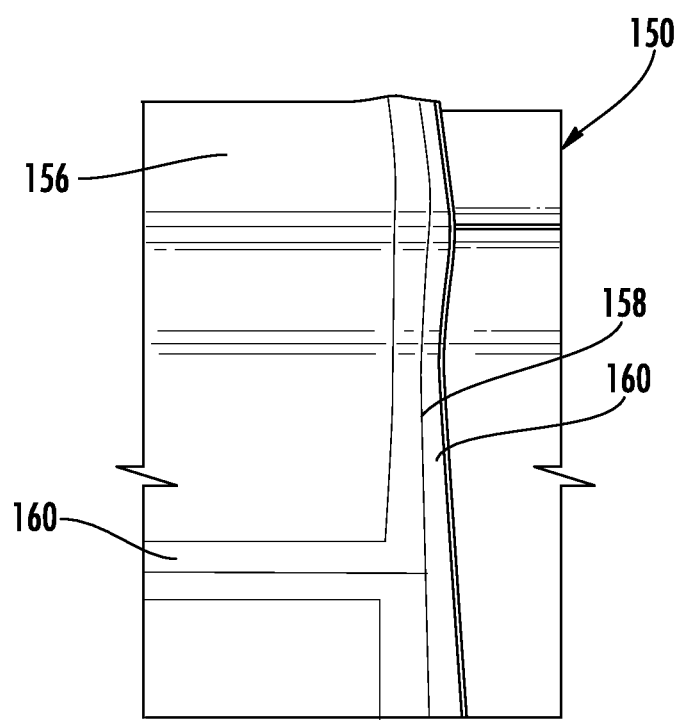
FIG. 12 illustrates a detailed view one of the metal mesh layer of FIG. 11, particularly illustrating an end of the metal mesh layer covered with a cover material.

As shown at (106), the method 100 includes providing one or more metal mesh layers 156 having one or more ends 158. Thus, the metal mesh layer(s) 156 are configured to provide lightning protection to the beam structure 40 during operation of the wind turbine 10 and/or structural support to the beam structure 40. For example, as shown in FIGS. 11-12, various views of a metal mesh layer 156 in the mold 150 of the beam structure 40 according to the present disclosure are illustrated. More specifically, as shown, the metal mesh layer 156 may be a flexible sheet material that defines at least one 158 or edge around a periphery thereof. Thus, as shown, the metal mesh layer 156 can be easily laid up in the mold 150 and is configured to conform to the shape of the mold 150. In addition, in one embodiment, the metal mesh layer(s) 156 may be constructed, at least in part, of copper or any other suitable metal material.

Thus, referring back to FIG. 7, as shown at (108), the method 100 includes providing a cover material 160 to the end(s) 158 of the metal mesh layer(s) 156. More specifically, in certain embodiments, the cover material 160 may include, for example, a composite fabric material (such as a chopped strand mat (CSM), a biax fabric, or a prepreg material), a prefabricated composite part, an adhesive, a resin, and/or any other suitable liquid material that hardens after application so as to provide a suitable cover to the end(s)/edge(s) 158 of the metal mesh layer(s) 156. FIGS. 11-12 further illustrate one embodiment of the cover material 160 arranged atop the end(s) 158 of the metal mesh layer(s) 156. For example, as shown in FIG. 11, the cover material 160 may be placed at the overlapping ends 158 of adjacent metal mesh layers 156 as shown at 165 within the mold 150. In addition, as shown in FIGS. 11 and 12, the cover material 160 may be placed at the outer ends 158 (i.e. outside of the mold 150) of the leading and trailing edge metal mesh layers 156.

Figure 9:
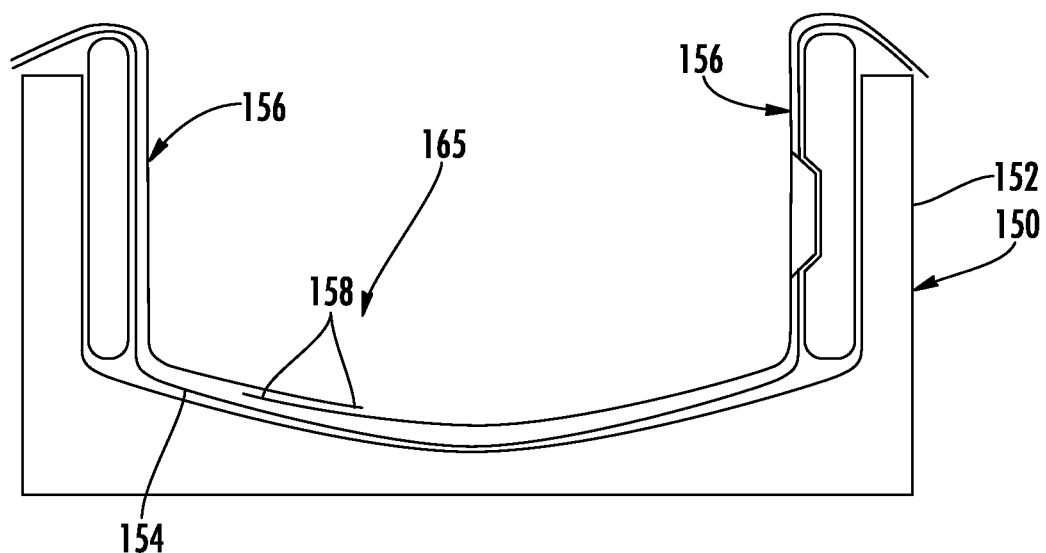
FIG. 9 illustrates a front view of the mold of FIG. 8 with a plurality of metal mesh layers laid therein atop the fiber layer.

As shown at (110), the method 100 includes placing the metal mesh layer(s) 156 with the covered end(s) 158 atop the fiber layer(s) 154. For example, as shown in FIGS. 8 and 9, the leading and trailing edge metal mesh layers 156 may be laid up in the mold 150 atop the fiber layers 154. More specifically, as shown in FIG. 9, a leading edge metal mesh layer 156 and a trailing edge metal mesh layer 158 may be placed into the mold 150 such that their respective ends 158 overlap as shown at 165.

In one embodiment, the method 100 may include tensioning the fiber layer(s) 154 after placing the metal mesh layer(s) 156 with the covered end(s) 158 adjacent to the fiber layer(s) 154. In such embodiments, the cover material 160 is configured to prevent snagging or tearing of the fiber layer(s) 154 against the metal mesh layer(s) 156.

Figure 10:
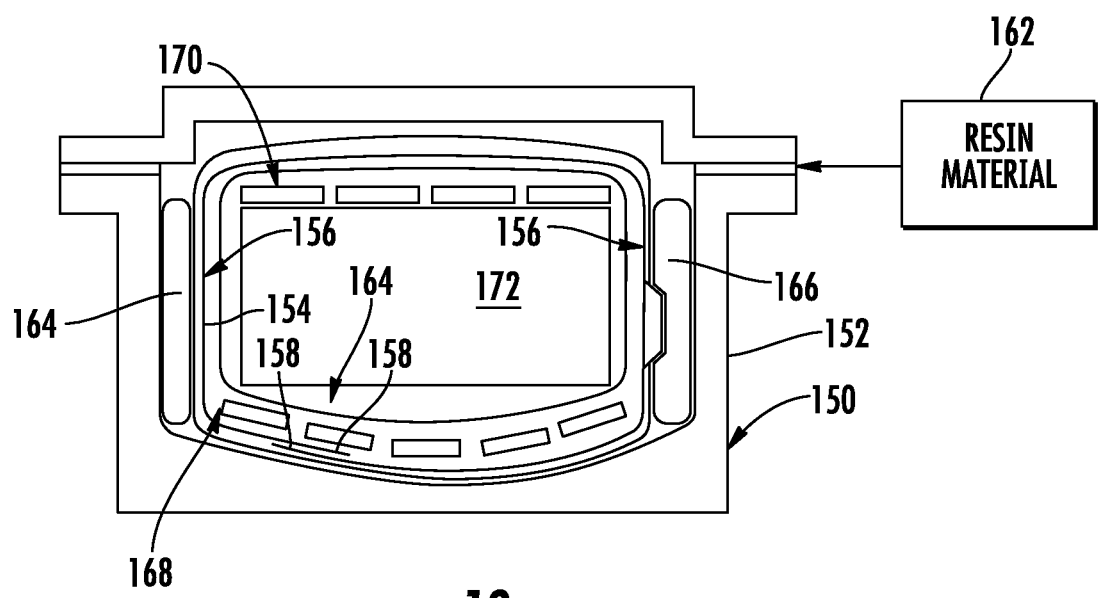
FIG. 10 illustrates a front view of the mold of FIG. 8 with a plurality of structural features placed therein.

Referring back to FIG. 7, as shown at (112), the method 100 includes infusing the fiber layer(s) 154 and the metal mesh layer(s) 156 together via a resin material 162 so as to form the beam structure 40. More specifically, as shown in FIG. 10, after placing the metal mesh layer(s) 156 with the covered end(s) 158 atop the fiber layer(s) 154, one or more additional structural features may be placed into the mold 150, i.e. so as to form the shape of the beam structure 40. For example, as shown, one or more shear webs 164, 166, one or more layers of pultrusions 168, 170, and/or a core or foam material 172 may be placed into the mold 150. In such embodiments, as shown, the ends of the various fiber layers 154 and metal mesh layers 156 may be folded or wrapped around the structural features to complete the beam structure shape. Thus, due to the cover material 160, when the outer ends 158 of the metal mesh layers 156 are folded around the internal structural features of the beam structure 40, the ends 158 do not snag the contacting portions of the fiber layers 154. In such embodiments, the method 100 may include infusing the fiber layer(s) 154, the metal mesh layer(s) 156, the shear webs 164, 166, the pultrusions 168, 170, and/or the core material 172 together via the resin material 162 so as to form the beam structure 40.

In certain embodiments, the resin material 162 may include a thermoset resin or a thermoplastic resin. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, the fiber layers described herein may include, for example, glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof.

Figure 13:
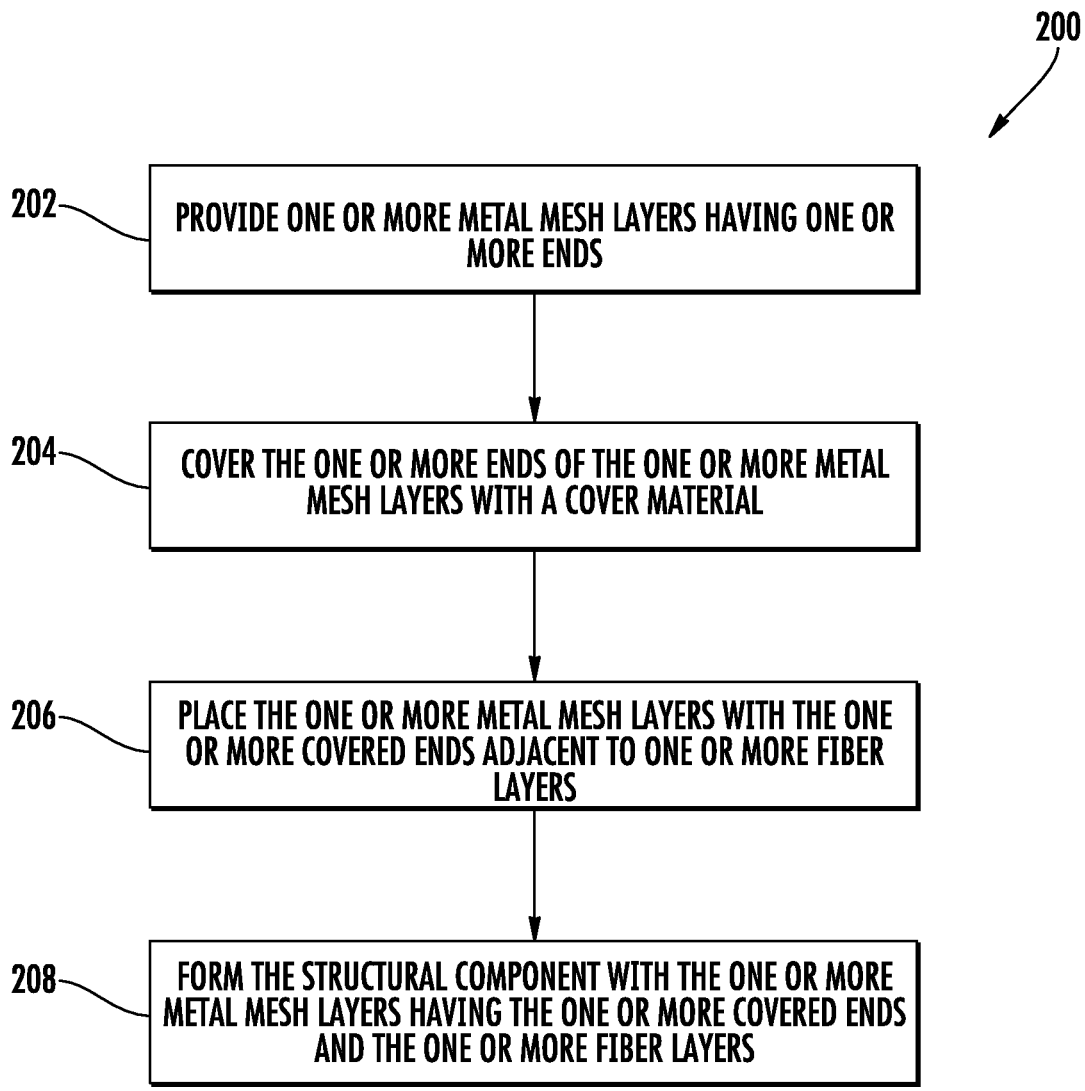
FIG. 13 illustrates a flow chart of one embodiment of a method for preventing manufacturing defects in a manufacturing process of a structural component of a blade segment of a rotor blade of a wind turbine according to the present disclosure.

Referring now to FIG. 13, a flow chart 200 of a method for preventing manufacturing defects in a manufacturing process of a structural component of a blade segment of a rotor blade of a wind turbine according to the present disclosure is illustrated. In general, the method 200 will be described herein with reference to the beam structure 40 of the rotor blade 28 shown in FIGS. 1-6 and 8-12. However, it should be appreciated that the disclosed method 200 may be implemented with any other suitable structural component of the rotor blade 28 (such as the receiving section 60) having any other suitable configurations. In addition, although FIG. 13 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include providing one or more metal mesh layers 156 having one or more ends 158. As shown at (204), the method 200 may include covering the end(s) 158 of the metal mesh layer(s) 156 with a cover material 160. As shown at (206), the method 200 may include placing the metal mesh layer(s) 156 with the covered end(s) 158 adjacent to one or more fiber layers 154. As shown at (208), the method 200 may include forming the beam structure 40 with the metal mesh layer(s) 156 having the covered end(s) 158 and the fiber layer(s) 154.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for preventing manufacturing defects in a manufacturing process of a structural component of a blade segment of a rotor blade of a wind turbine, the method comprising:
   providing one or more metal mesh layers having one or more ends;
   covering the one or more ends of the one or more metal mesh layers with a cover material;
   placing the one or more metal mesh layers with the one or more covered ends adjacent to one or more fiber layers within a mold;
   forming the structural component with the one or more metal mesh layers having the one or more covered ends and the one or more fiber layers; and
   wherein the cover material is disposed completely around a periphery of the metal mesh layer without covering at least a portion of an interior region of the metal mesh layer bordered by the cover material prior to placing the metal mesh layers with the covered ends adjacent to the fiber layers in the mold.

2. The method of claim 1, wherein the cover material comprises at least of a composite fabric material, a prefabricated composite part, an adhesive, or a resin.

3. The method of claim 1, wherein the one or more metal mesh layers are constructed, at least in part, of copper.

4. The method of claim 1, further comprising infusing the one or more metal mesh layers having the one or more covered ends and the one or more fiber layers together within the mold via a resin material.

5. The method of claim 4, wherein forming the structural component with the one or more metal mesh layers having the one or more covered ends and the one or more fiber layers further comprises placing one or more shear webs into the mold and infusing the one or more shear webs with the one or more metal mesh layers having the one or more covered ends and the one or more fiber layers together via the resin material.

6. The method of claim 1, wherein the structural component comprises at least one of a beam structure or a receiving section of the blade segment.

7. The method of claim 4, wherein the resin material comprises at least one of a thermoset resin or a thermoplastic resin.

8. The method of claim 1, wherein the one or more metal mesh layers are configured to provide at least one of lightning protection to the structural component during operation of the wind turbine or structural support to the structural component.

9. A method for preventing manufacturing defects in a manufacturing process of a structural component of a blade segment of a rotor blade of a wind turbine, the method comprising:
   providing one or more metal mesh layers having one or more ends;
   covering the one or more ends of the one or more metal mesh layers with a cover mated al;
   placing the one or more metal mesh layers with the one or more covered ends adjacent to one or more fiber layers;
   forming the structural component with the one or more metal mesh layers having the one or more covered ends and the one or more fiber layers; and
   further comprising tensioning the one or more fiber layers after placing the one or more metal mesh layers with the one or more covered ends adjacent to the one or more fiber layers.

10. A method for manufacturing a structural component of a blade segment for a rotor blade of a wind turbine, the method comprising:
    providing a mold of the structural component;
    laying up one or more fiber layers on or in the mold, the one or more fiber layers forming a surface of the structural component;
    providing one or more metal mesh layers having one or more ends;
    providing a cover material completely around a periphery of the meal mesh layers so as to cover the one or more ends of the one or more metal mesh layers without covering at least a portion of an of an interior region of the metal mesh layers bordered by the cover material;

placing the one or more metal mesh layers with the one or more covered ends atop the one or more fiber layers; and, infusing the one or more fiber layers and the one or more metal mesh layers together via a resin material so as to form the structural component.

11. The method of claim 10, wherein the cover material comprises at least of a composite fabric material, a prefabricated composite part, an adhesive, or a resin.

12. The method of claim 10, wherein the structural component comprises at least one of a beam structure or a receiving section of the blade segment.

13. The method of claim 10, wherein the one or more metal mesh layers are constructed, at least in part, of copper.

14. The method of claim 10, further comprising placing one or more structural features into the mold and infusing the one or more structural features with the one or more fiber layers and the one or more metal mesh layers together via the resin material.

15. A method for manufacturing a structural component of a blade segment for a rotor blade of a wind turbine, the method comprising:

providing a mold of the structural component;

laying up one or more fiber layers on or in the mold, the one or more fiber layers forming a surface of the structural component;

providing one or more metal mesh layers having one or more ends;

providing a cover material to the one or more ends of the one or more metal mesh layers;

placing the one or more metal mesh layers with the one or more covered ends atop the one or more fiber layers;

infusing the one or more fiber layers and the one or more metal mesh layers together via a resin material so as to form the structural component; and further comprising tensioning the one or more fiber layers after placing the one or more metal mesh layers with the one or more covered ends adjacent to one or more fiber layers.

16. A structural component for a blade segment of a rotor blade of a wind turbine, the structural component comprising:

one or more metal mesh layers having one or more ends;

a cover material covering the one or more ends of the one or more metal mesh layers;

one or more fiber layers adjacent to the one or more metal mesh layers;

a resin material securing the one or more metal mesh layers, the cover material, and the one or more fiber layers together; and wherein the cover material is disposed completely around a periphery of the metal mesh layer without covering at least a portion of an interior region of the metal mesh layer bordered by the cover material.

17. The structural component of claim 16, further comprising one or more structural features secured within the resin material.

18. The structural component of claim 17, wherein the one or more structural features comprise at least one of one or more layers of pultrusions, one or more shear webs, or a core material.

19. The structural component of claim 16, wherein the cover material comprises at least of a composite fabric material, a prefabricated composite part, an adhesive, or a resin, the one or more metal mesh layers being constructed, at least in part, of copper.

20. The structural component of claim 16, wherein the structural component comprises at least one of a beam structure or a receiving section of the blade segment.

* * * * *